Oct. 19, 1937.  M. A. AHERNE  2,096,021
CHLORINATOR
Filed Feb. 10, 1936
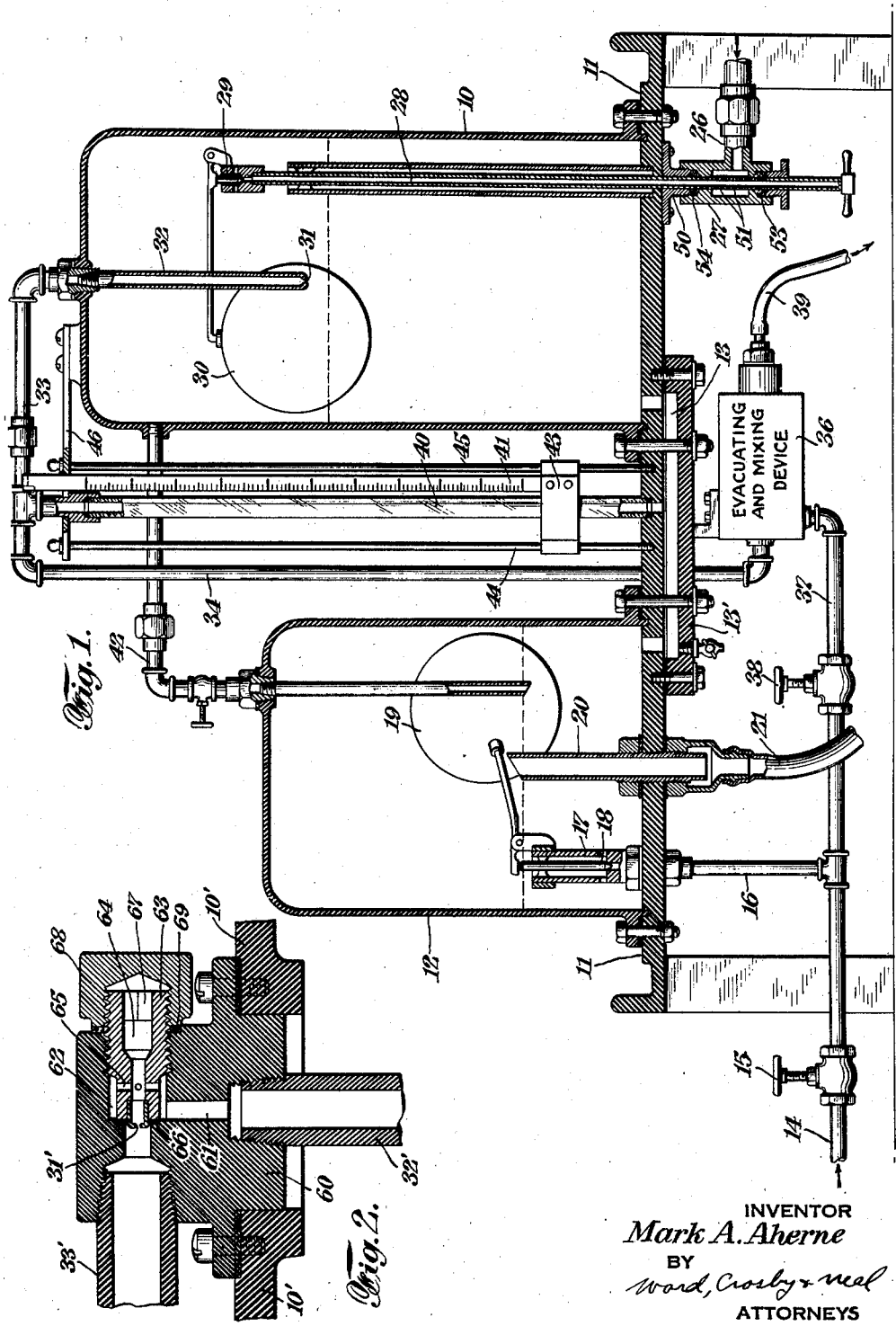
INVENTOR
*Mark A. Aherne*
BY
*Word, Crosby & Neel*
ATTORNEYS Patented Oct. 19, 1937

2,096,021

UNITED STATES PATENT OFFICE 2,096,021

CHLORINATOR

Mark A. Aherne, Astoria, N. Y., assignor of fifty per cent to Ralph W. Nauss, New York, N. Y.

Application February 10, 1936, Serial No. 63,089

18 Claims. (Cl. 210—28)

This invention relates to improvements in chlorinators or apparatus for affecting the union of gas such as chlorine with other fluids or liquids such as water or steam.

The objects of the invention include the provision of apparatus of the above indicated character which is relatively simple, durable, reliable and efficient in operation. A further object is to provide an apparatus of a type which will insure against the escape of the highly corrosive and dangerous chlorine gas and also an apparatus in which the various parts of the control mechanism most likely to be damaged by water in conjunction with the chlorine gas, will be adequately protected against the possibility of such injury.

Various further and more specific objects, features and advantages will clearly appear from the detailed description given below taken in connection with the accompanying drawing forming a part of this specification and illustrating by way of example a preferred embodiment of the invention. The invention consists in such novel features, arrangements, combinations of parts and methods as are described in connection with the apparatus herein disclosed by way of example only.

In the drawing, Fig. 1 comprises an elevational view partly in section, showing the assembly of the apparatus comprising one embodiment of my invention; and Fig. 2 is a sectional view showing certain details of a modified embodiment of the invention.

The apparatus as shown may comprise a chamber 10 formed of molded hard rubber or other suitable material, capable of withstanding the corrosive action of chlorine or other gases or mixtures used in the apparatus. The chamber may be mounted upon a suitable hard rubber support as at 11. An enclosed receptacle 12 also preferably molded of suitable material not subject to corrosive action, is mounted adjacent the chamber 10 upon the support 11. The lower portions of the chamber 10 and receptacle 12 may be interconnected by a suitable passageway 13 of a size sufficient to provide for free flowing of liquid, this passageway being preferably formed in the base 11 or adjacent thereto, as by securing a grooved strip of hard rubber 13' to the under side of the base.

A source of supply of water or other suitable liquid is indicated at 14 controlled by a valve as at 15 connected by a pipe 16 to the receptacle 12, the pipe 16 being provided with a hard rubber extension 17 running up through the base 11 into the lower part of the receptacle 12. Liquid flowing through this connection into the receptacle 12 may be controlled by a float operated valve 18 of suitable construction, mounted upon the extension 17 and having a float 19 acted on by the liquid in receptacle 12. The maximum liquid level in the receptacle 12 may be limited by an overflow pipe 20 formed of silver or other non-corrodible material and extending down through the base to a vent and waste pipe connection 21. The overflow pipe and the connection thereto are preferably made of such diameter as to provide a vent for the receptacle 12 so that the pressure above the liquid therein will be maintained at substantially atmospheric pressure. The vent and waste pipe connection 21 is preferably extended out of doors or to a sewer, or to some point where the discharge of chlorine gas or chlorinated water therefrom will not cause damage.

The source of chlorine or other gas to be used with the apparatus may comprise a gas tank connected by a pipe 26 to a slidable fitting 27 hereinafter described. From this fitting the gas is conducted up through the base 11 in a tube 28 to a float controlled gas valve 29, the degree of opening of which is determined by a float 30 resting in the liquid contained in the chamber 10. The elevation of the apertures at the valve 29 through which gas is admitted to the chamber 10 may be adjusted by the adjustable fitting at 27.

A gas outlet orifice 31 may be mounted within the chamber 10 at the lower end of a non-corrodible pipe 32. The tube 32, for example, may be made of glass and the orifice in a simple form may comprise a small perforation of carefully predetermined size through the lower end of the tube. However, the orifice is preferably positioned at a point outside the chamber 10 as at 31' in Fig. 2 hereinafter described in further detail. Gas withdrawn from the orifice 31 is conducted through the pipe 32 and connections 33, 34 to a suitable evacuating and mixing device such as an injector or ejector 36, preferably mounted on the lower side of the base 11. One example of a suitable type of adjustable injector which may be used for this apparatus is disclosed in my Patent No. 1,922,920, granted August 15, 1933. The injector or ejector may be provided with a connection 37 running to a source of supply of the fluid or liquid with which the chlorine or other gas is to be mixed. For example, in the embodiment of the apparatus shown, the connection 37 may extend to the source of water supply through an adjustable valve 38. The mixture of chlorine or other gas with the fluid intermixed therewith in the injector, may be conducted away through a connection 39.

The injector or ejector 36 serves to create a partial vacuum or suction through the connections 32 to 34 for withdrawing gas through the orifice 31 (or 31'), the degree of such partial vacuum varying somewhat, depending upon adjustments of the injector and variations in the supply of water or other fluid admitted through the connection 37. Upon an increase in the water pressure the suction effect upon the orifice will be increased with a corresponding tendency to increase the degree of vacuum above the liquid in chamber 10. Thereupon the float 30 will rise, causing the valve 29 to be more widely opened for the admission of more gas. On the other hand, if through adjustment of the evacuating device or if the water supply thereto is decreased, the suction effect on the orifice is decreased with a consequent tendency for the pressure to increase within the chamber 10, thus allowing the liquid level to drop and permitting the float controlled gas inlet valve to be moved toward closed position.

A manometer tube 40 may be provided with its lower end brought into communication with the liquid within the chamber 10 and receptacle 12, as by joining the same with the connection 13. The upper end of the manometer tube may be brought into communication with the gas pipes 33 and 34. The manometer may be provided with an adjustable scale 41 arranged so that the zero point on the scale may be adjusted to the liquid level at a time when gas is not being introduced into or withdrawn from the apparatus. For this purpose the scale may be mounted upon a member 43 which is vertically slidable on rods 44 and 45 having their lower ends fixed in the base 11 and their upper ends retained in place as by a bracket 46 secured to the chamber 10. The manometer thus provides a convenient means for giving a direct reading of the pressure (partial vacuum) of the gas after being withdrawn through the orifice 31. Also, with a given adjustment of the elevation of the float 30 and with an orifice 31 of predetermined size, the manometer may be calibrated to indicate substantially accurately the rate of flow of gas through the orifice to the injector or ejector 36.

In the above described construction, it will be noted that the lower end of tube 32 is located at an elevation above the normal liquid level at which the float 30 operates to admit gas to the chamber 10, but below the gas inlet at valve 29. This position of the orifice is a highly desirable feature in that it substantially prevents the possibility of the liquid level rising under abnormal conditions to an extent such as to flood the gas inlet and inlet valve 29 and the gas connections thereto. If these parts should be flooded with chlorinated water, the resulting corrosive action and clogging with water would be likely to render the apparatus inoperative or greatly interfere with dependable operation. However, with the lower end of tube 32 positioned as shown, if the gas pressure should fail or for any reason should become abnormally low, while the degree of vacuum in the chamber 10 continued to increase with the rising of the liquid level, then as soon as the liquid level reaches the end of tube 32, liquid will be drawn off therethrough and further rising of the liquid level will be prevented before liquid can reach the gas intake valve.

Under some circumstances, as for example where the chlorine gas supply is shut off, the liquid level in chamber 10 will continue to rise until the outlet pipe 32 is reached and water will be drawn through outlet pipe 32, etc., so long as the ejector continues to operate. If then the water supply should fail or the ejector fail to function, the degree of vacuum within the chamber 10 may abnormally increase due to absorption of the gas by the water in the chamber. Under such circumstances, in order to prevent the liquid level in chamber 10 from rising into contact with the gas inlet valve, a connection 42 is provided to "break" the vacuum in the chamber 10. The connection 42 may have one end as shown communicating with the upper part of chamber 10 and its other end communicating with receptacle 12 at a point below the normal liquid level therein. This connection if desired may be provided with a suitable valve as shown, permitting closing of the connection when desired as for example when starting up or adjusting the apparatus. Therefore, if the gas within the chamber 10 should become absorbed by the liquid to a substantial extent, causing the liquid level to rise in chamber 10 with an abnormal lowering of the level in receptacle 12, then the end of the connection 42 within the receptacle will be exposed to the air or gas within the receptacle, and thereby allow air or gas to flow into the chamber 10 sufficient to permit the liquid level therein to fall.

It will be noted that with the above described apparatus, once it is put into normal operation, there will be no necessity of admitting additional water or equivalent liquid thereto, except for such small quantities as may evaporate or be lost. Thus, if the equipment is to be used for mixing chlorine with steam, for example, there will be no expense incurred in providing the necessary water for use with the apparatus; and in case the chlorine is to be mixed with water, the amount of water used may be limited to the minimum required or desired at the injector to carry away the water chlorine mixture. It will also be noted that when the apparatus is used with a source of water supply which may be somewhat variable, the amount of chlorine gas withdrawn by the injector will also vary, so that if more water is supplied, an adequate corresponding increase of gas will also be mixed therewith, or if the water supply is decreased, the gas flow will be decreased, but without materially varying the trifling quantity of water used within the apparatus in the control of the equipment. And yet with normal operation, the accurately predetermined dimensions of the gas orifice will not be interfered with or restricted by the water.

A common form of apparatus of this character heretofore used embodies a gas chamber in the form of a bell jar in a tray of water. If said jar becomes broken or knocked out of place, or if through any abnormal condition sufficient gas is introduced therein to cause a rush of gas or water out from beneath the bell jar, then the exceedingly destructive and poisonous gas may escape into the room and do serious damage. However, any such escape of gas is substantially precluded with the above described apparatus, wherein the chamber and receptacle and other parts which may contain the gas and water may be fully enclosed and may be made of non-fragile material, rigidly affixed to the support. The slidable fitting 27 may comprise a cast main body portion as shown adapted to be sealed to a hollow lug member 50 mounted on the under side of the support 11. The fitting is also provided with a central aperture as shown for slidably receiving the lower end of the tube 28. This tube may be provided with a plurality of perforations as at 51 to permit gas from the gas tank which enters the interior of the fitting, to pass on into the tube 28 notwithstanding the fact that the tube may be moved to various vertical positions of adjustment. The lower end of the tube 28 may be sealed off as shown and provided with a handle 52 to permit the tube to be slidably adjusted through packing glands as at 53 and 54 to thereby adjust the elevation of the float controlled valve 29 to the desired height.

With the orifice arrangement shown in Fig. 2, the orifice 31' is provided in the form of a removable hollow glass member mounted in suitable fittings externally of the chamber 10', whereby it is accessible for inspection, cleaning or replacement with substantially a minimum of interference with other parts of the apparatus. In this embodiment the orifice is also located at a point more remote from the liquid in the chamber 10', so that there is less liability that the orifice and associated parts will come in contact with the liquid. As shown in Fig. 2, the orifice supporting fittings may comprise a block of hard rubber 60 removably secured in sealed relationship with the top of the chamber 10' as shown. A tube 32' corresponding to the tube 32 above referred to, but with its lower end freely open, is shown extending into the lower end of the block 60 in communication with a cavity 61 opening into a cylindrical space 62 for receiving a threaded plug member 63 carrying the orifice member 31' at its inner end. The plug member 63 is preferably made of silver or other non-corrodible material and is provided with a central aperture 64 communicating with the space 62 as by perforations 65. The inner end of the plug member 63 may be sealed in respect to the block 60 by a suitable gasket 66. A cavity within the outer end of the plug 63, as at 67, may be made in a rectangular or other suitable form for receiving a wrench for screwing the plug into position. The outer end of the plug may be sealed with a cap as at 68 threaded to the plug as shown, and sealed as by gasket 69 to the hard rubber block 60. The orifice 31' communicates with a connection pipe 33' corresponding to the pipe 33 above referred to. With this construction in case the apparatus is to be used with various different rates of gas flow or with different gases, several easily interchangeable orifice members may be provided, each having the proper carefully predetermined cross-sectional orifice area.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A chlorinator comprising in combination, an enclosed chamber, a liquid receptacle in communication with the pressure of the atmosphere, a connection between the lower portions of said chamber and receptacle and permitting the free flow of liquid therebetween, means for maintaining a normally substantially constant liquid level in said receptacle, a gas inlet with a float controlled valve for admitting gas into said chamber at a point above the normal liquid level therein, a gas outlet in said chamber above the normal liquid level therein, said gas outlet being at an elevation sufficiently below said inlet to also provide a liquid outlet precluding danger of flooding of said inlet valve upon an abnormal rise of liquid in said chamber, and an evacuating device connected to said gas outlet for withdrawing fluid therethrough from said chamber and for causing a partial vacuum to be maintained in said chamber to control the liquid level therein, thereby also controlling said float controlled valve and the admission of gas to the chamber.

2. A chlorinator comprising in combination, an enclosed chamber, an enclosed liquid receptacle, means including a float operated valve and overflow for maintaining a normally substantially constant liquid level in said receptacle, means permitting free flow of liquid between the lower portions of said chamber and receptacle, a variable gas inlet under the control of a float in said chamber for admitting gas therein at a point above the normal liquid level therein, an outlet for said chamber below said inlet and above the liquid level at which said float in said chamber operates to admit gas therein, and an evacuating device connected to said outlet, said outlet being at an elevation sufficiently below said gas inlet to provide an emergency liquid outlet precluding danger of flooding said inlet upon an abnormal decrease of pressure in said chamber.

3. A chlorinator comprising in combination, an enclosed chamber, an opening for admitting liquid to the lower part of said chamber, means for maintaining said opening filled with liquid at substantially constant pressure, a variable gas inlet under the control of a float in said chamber for admitting gas therein at a point above the normal liquid level therein, an outlet for said chamber below said inlet and above the liquid level at which said float in said chamber operates to admit gas therein, and an evacuating device connected to said outlet, said outlet being at an elevation sufficiently below said gas inlet to provide an emergency liquid outlet precluding danger of flooding said inlet upon an abnormal decrease of pressure in said chamber.

4. A chlorinator comprising in combination, an enclosed chamber, an opening for admitting liquid to the lower part of said chamber, means for maintaining said opening filled with liquid at substantially constant pressure, a gas inlet with a float controlled valve for admitting gas into said chamber at a point above the normal liquid level therein, a gas outlet in said chamber above the normal liquid level therein, said gas outlet being at an elevation sufficiently below said inlet to also provide a liquid outlet precluding danger of flooding of said inlet valve upon an abnormal rise of liquid in said chamber, and an evacuating device connected to said gas outlet for withdrawing fluid therethrough from said chamber and for causing a partial vacuum to be maintained in said chamber to control the liquid level therein, thereby also controlling said float controlled valve and the admission of gas to the chamber.

5. A chlorinator comprising in combination, an enclosed chamber, an opening for admitting liquid to the lower part of said chamber, means for maintaining said opening filled with liquid at substantially constant pressure, a variable gas inlet under the control of a float in said chamber for admitting gas therein at a point above the normal liquid level therein, an evacuating device, a gas connection having one end extending downwardly to a point above the normal liquid level in said chamber and below said gas inlet, said connection providing a gas outlet at said point, the other end of said gas connection extending to said device, and a manometer tube outside said chamber and having its lower end in communication with the liquid within said chamber and its upper end in communication with said gas connection.

6. A chlorinator comprising in combination, an enclosed chamber, an enclosed liquid receptacle, means for normally maintaining a substantially constant liquid level in said receptacle, means permitting free flow of liquid between the lower portions of said chamber and receptacle, a variable gas inlet under the control of a float in said chamber for admitting gas therein at a point above the normal liquid level therein, a gas outlet in said chamber above the normal liquid level therein, an evacuating device, a gas connection positioned to be normally free of liquid and extending from said outlet to said device, and a manometer tube outside said chamber and having its lower end in communication with the liquid within said chamber and its upper end in communication with said gas connection.

7. A chlorinator comprising in combination, an enclosed chamber, an enclosed liquid receptacle, means for normally maintaining a substantially constant liquid level in said receptacle, means permitting free flow of liquid between the lower portions of said chamber and receptacle, a gas inlet in said chamber for admitting gas therein at a point above the normal liquid level therein, a gas outlet in said chamber, an evacuating device connected to said outlet, and means preventing excessively low pressure in the gas space within said chamber upon failure of the normal gas supply and upon substantial reduction of the normal liquid level in said receptacle, said means comprising a conduit extending from the gas space in the chamber to a point below but close to the normal liquid level within the receptacle.

8. Apparatus for controlling the flow of gas from a source of supply and mixing the same with another fluid, comprising an enclosed chamber, an opening for admitting liquid to the lower part of said chamber, means for maintaining said opening filled with liquid at substantially constant pressure, a variable gas inlet under the control of a float in said chamber for admitting gas therein at a point above the normal liquid level therein, a gas outlet for said chamber below said inlet and above the liquid level at which said float in said chamber operates to admit gas therein, and an evacuating and mixing device connected to said outlet for withdrawing the gas and mixing the same with said other fluid, said outlet being at an elevation sufficiently below said gas inlet to provide an emergency liquid outlet precluding danger of flooding said inlet upon an abnormal decrease of pressure in said chamber.

9. Apparatus for controlling the flow of gas from a source of supply and mixing the same with another fluid, comprising an enclosed chamber, a liquid receptacle in communication with the pressure of the atmosphere, a connection between the lower portions of said chamber and receptacle and permitting the free flow of liquid therebetween, means for maintaining a normally substantially constant liquid level in said receptacle, a gas inlet with a float controlled valve for admitting gas from the source into said chamber at a point above the normal liquid level therein, a gas outlet in said chamber above the normal liquid level therein, said gas outlet being at an elevation sufficiently below said inlet to also provide an emergency liquid outlet precluding danger of flooding of said inlet valve upon an abnormal decrease of pressure in the space above the liquid in said chamber, and an evacuating and mixing device connected to said outlet for withdrawing the gas and mixing the same with said other fluid and for causing a partial vacuum to be maintained in said chamber to control the liquid level therein, thereby also controlling said float controlled valve and the admission of gas to the chamber.

10. A chlorinator comprising in combination, an enclosed chamber, an enclosed liquid receptacle, said chamber and receptacle being both rigidly secured side-by-side to a supporting base, means for maintaining a normally substantially constant liquid level in said receptacle, a connection at said base between said chamber and receptacle permitting the free flow of liquid between the lower portions thereof, a variable float controlled gas inlet in said chamber for admitting gas thereto at a point above the normal liquid level therein, a gas outlet for said chamber above the liquid level therein, an evacuating device removably mounted on said base, a gas connection normally free of liquid and extending from said outlet to said device, and a manometer having top and bottom ends respectively in communication with said connections to indicate the difference in pressure therein.

11. A chlorinator comprising in combination, an enclosed chamber, an enclosed liquid receptacle, said chamber and receptacle being both rigidly secured side-by-side to a supporting base, means for maintaining a normally substantially constant liquid level in said receptacle, a connection at said base between said chamber and receptacle permitting the free flow of liquid between the lower portions thereof, a variable float controlled gas inlet in said chamber for admitting gas thereto, a gas outlet for said chamber, an evacuating device connected to said outlet and mounted on said base, and a manometer mounted on said base between the chamber and receptacle, said manometer having its top and bottom ends respectively in communication with the gas after being withdrawn through said outlet and with the liquid in said receptacle.

12. A chlorinator comprising in combination, an enclosed chamber, an enclosed liquid receptacle, means including a float operated valve and overflow for maintaining a normally substantially constant liquid level in said receptacle, means permitting free flow of liquid between the lower portions of said chamber and receptacle, a variable gas inlet under the control of a float in said chamber for admitting gas therein at a point above the normal liquid level therein, an outlet for said chamber below said inlet and above the liquid level at which said float in said chamber operates to admit gas therein, a connection leading from said outlet and having a restricting orifice located therein at a point outside said chamber, and an evacuating device for withdrawing fluid through said orifice, said outlet being at an elevation sufficiently below said gas inlet to provide an emergency liquid outlet precluding danger of flooding said inlet upon an abnormal decrease of pressure in said chamber.

13. A chlorinator comprising in combination, an enclosed chamber, an opening for admitting liquid to the lower part of said chamber, means for maintaining said opening filled with liquid at substantially constant pressure, a variable gas inlet under the control of a float in said chamber for admitting gas therein at a point above the normal liquid level therein, a gas outlet for said chamber below said inlet and above the liquid level at which said float in said chamber operates to admit gas therein, an evacuating device, a connection leading from said outlet to said device, and a restricting orifice located in said connection, said gas outlet being at an elevation sufficiently below said gas inlet to also provide an emergency liquid outlet precluding danger of flooding said inlet upon an abnormal rise of liquid in said chamber.

14. A chlorinator comprising in combination, an enclosed chamber, an opening for admitting liquid to the lower part of said chamber, means for maintaining said opening filled with liquid at substantially constant pressure, a variable gas inlet under the control of a float in said chamber for admitting gas therein at a point above the normal liquid level therein, a gas outlet for said chamber above the normal liquid level therein, an evacuating device, a gas connection normally free of liquid extending from said outlet to said device, a restricting orifice located in said connection, and a manometer tube having its lower end in communication with the liquid within said chamber and its upper end in communication with said gas connection at a point between said orifice and said device.

15. Apparatus for controlling the flow of gas from a source of supply and mixing the same with another fluid, comprising an enclosed chamber, an opening for admitting liquid to the lower part of said chamber, means for maintaining said opening filled with liquid at substantially constant pressure, a variable gas inlet under the control of a float in said chamber for admitting gas therein at a point above the normal liquid level therein, a gas outlet for said chamber below said inlet and above the liquid level at which said float in said chamber operates to admit gas therein, a connection leading from said outlet and having a restricting orifice located therein at a point whereby such orifice is removable without opening said chamber, and an evacuating and mixing device connected to normally withdraw gas through said orifice and for mixing the same with said other fluid, said gas outlet being at an elevation sufficiently below said gas inlet to also provide an emergency liquid outlet precluding danger of flooding said inlet upon an abnormal rise of liquid in said chamber.

16. A chlorinator comprising in combination, an enclosed chamber, an opening for admitting liquid to the lower part of said chamber, means for maintaining said opening filled with liquid at substantially constant pressure, a variable gas inlet under the control of a float in said chamber for admitting gas therein at a point above the normal liquid level therein, a gas outlet conduit extending through the wall of the upper portion of said chamber and downwardly to provide a gas exit opening adjacent to but above the normal liquid level in said chamber, and an evacuating device connected to said conduit outside said chamber.

17. A chlorinator comprising in combination, an enclosed chamber, an opening for admitting liquid to the lower part of said chamber, means for maintaining said opening filled with liquid at substantially constant pressure, a variable gas inlet under the control of a float in said chamber for admitting gas therein at a point above the normal liquid level therein, a gas outlet conduit extending through the wall of the upper portion of said chamber and downwardly to provide a gas exit opening adjacent to but above the normal liquid level in said chamber, a manometer tube outside said chamber and having its lower end in communication with the liquid within said chamber and its upper end in communication with said conduit, and an evacuating device connected to said conduit outside said chamber.

18. A chlorinator comprising in combination, an enclosed chamber, an opening for admitting liquid to the lower part of said chamber, means for maintaining said opening filled with liquid at substantially constant pressure, a variable gas inlet under the control of a float in said chamber for admitting gas therein at a point above the normal liquid level therein, a gas outlet conduit extending through the wall of the upper portion of said chamber and downwardly to provide a gas exit opening adjacent to but above the normal liquid level in said chamber, an evacuating device connected to said conduit outside said chamber, an orifice member in said conduit outside said chamber and between said chamber and said device, and means for removably retaining said orifice member in position whereby it may be replaced without disturbance of the liquid within said chamber.

MARK A. AHERNE.